United States Patent [19]

Karn et al.

[11] Patent Number: 4,982,026

[45] Date of Patent: Jan. 1, 1991

[54] LOWER ALKENE POLYMERS

[75] Inventors: Jack L. Karn, Richmond Heights; Willis P. Nichols, Cleveland, both of Ohio

[73] Assignee: The Lubrizol Corporation, Wickliffe, Ohio

[21] Appl. No.: 539,934

[22] Filed: Jun. 18, 1990

Related U.S. Application Data

[62] Division of Ser. No. 79,855, Jul. 30, 1987.

[51] Int. Cl.$^5$ ............................................. C07C 11/02
[52] U.S. Cl. ......................................... 585/18; 585/12; 585/17
[58] Field of Search ...................... 585/18, 17, 12, 525, 585/526, 527, 514, 515

[56] References Cited

U.S. PATENT DOCUMENTS

| | | | |
|---|---|---|---|
| 1,885,060 | 10/1932 | Hoffmann et al. | 585/525 |
| 2,199,180 | 4/1940 | Laughlin | 585/526 |
| 2,357,926 | 9/1944 | Bannon | 585/526 |
| 2,369,691 | 2/1945 | Schmurling et al. | 502/216 |
| 2,404,788 | 6/1946 | Burk et al. | 585/525 |
| 2,406,869 | 8/1942 | Upham | 585/525 |
| 2,416,106 | 2/1947 | Linn et al. | 585/525 |
| 2,421,946 | 6/1947 | Ipatieff et al. | |
| 2,442,642 | 6/1948 | Elwell | 585/525 |
| 2,536,841 | 1/1951 | Donnie | 502/216 |
| 2,569,383 | 9/1951 | Leyonmark | 585/525 |
| 2,585,867 | 2/1952 | Sparks et al. | 526/237 |
| 2,801,273 | 7/1957 | Bohlbro et al. | |
| 2,810,774 | 10/1957 | Serniuk | 585/525 |
| 2,816,944 | 12/1957 | Muessig | 585/525 |
| 2,855,447 | 10/1958 | Griesinger et al. | 585/525 |
| 2,960,552 | 11/1960 | Wasley | 556/177 |
| 2,976,338 | 3/1961 | Thomas | 585/525 |
| 3,126,420 | 3/1964 | Bloch et al. | 585/255 |
| 3,749,560 | 7/1973 | Perilstein | 585/525 |
| 3,769,363 | 10/1973 | Brennan | 585/525 |
| 3,932,553 | 1/1976 | Robert | 585/525 |
| 3,985,822 | 10/1976 | Watson | 585/520 |
| 4,308,414 | 12/1981 | Madgarkar | 585/525 |
| 4,400,565 | 8/1983 | Darden | 585/525 |
| 4,407,731 | 10/1983 | Imai | 502/203 |
| 4,429,177 | 1/1984 | Morganson et al. | 585/525 |
| 4,469,912 | 9/1984 | Blewett | 585/525 |
| 4,605,808 | 8/1986 | Samson | 585/525 |
| 4,691,072 | 9/1987 | Schick | 585/525 |

FOREIGN PATENT DOCUMENTS

| | | | |
|---|---|---|---|
| 473670 | 5/1951 | Canada | 585/525 |
| 1148966 | 4/1969 | United Kingdom . | |
| 1449840 | 9/1976 | United Kingdom . | |

OTHER PUBLICATIONS

Stehling et al. "Molecular Structure of Hydrocarbon Olefins by High Resolution Nuclear Magnetic Resonance" Anal. Chem. 38, (11), pp. 1467–1478 (1966).

Couperus et al, "Chemical Shifts of Some Model Olefins," Org. Magn. Reson. 8, pp. 426–431 (1976).

*Primary Examiner*—Asok Pal
*Attorney, Agent, or Firm*—Forrest L. Collins; Frederick D. Hunt; Robert A. Franks

[57] ABSTRACT

This invention describes highly reactive polymers obtained from lower monomers. The polymers are particularly useful in alkylation reactions.

31 Claims, No Drawings

LOWER ALKENE POLYMERS

This Application is a divisional application of application Ser. No. 07/079,855, filed 7/30/87 now being allowed.

BACKGROUND OF THE INVENTION

1. Field of the Invention

This invention relates to a process and the resultant composition whereby a lower alkene monomer is converted to a lower alkene polymer through the use of unique reaction conditions and catalyst system. The lower alkene polymers so obtained have a high degree of mono-unsaturation content and are highly reactive in various reactions.

2. Description of the Art Practices

It is known from U.S. Pat. No. 2,816,944 issued Dec. 17, 1957 to Muessig et al that olefinic polymers ranging in a carbon content of from 12 to 50 carbon atoms obtained from olefins having 5 to 25 carbon atoms may be prepared by using boron trifluoride with phosphoric acid. It is generally disclosed by Muessig et al that the polymerization may take place using kieselguhr, and is conveniently conducted at a temperature of 35° C. to 60° C.

Serniuk in U.S. Pat. No. 2,810,774 issued Oct. 22, 1957 describes an olefin polymerization catalyst system comprising boron trifluoride and acids of phosphorus. It is also disclosed by Serniuk that various absorbents such as aluminum silicates, kieselguhr, Fuller's earth, clays and silica gel may be employed as a support system for the catalyst. The Serniuk reference describes reaction temperatures of 77° F. (24° C.) to 212° F. (100° C.) during the polymerization. The olefins of Serniuk include a mixed propylene-butylene system having an active content of about 40% olefins.

U.S. Pat. No. 2,976,338 issued Mar. 21, 1961 to Thomas discloses a catalyst system comprising boron trifluoride and phosphoric acid as being too active for polymerizing olefins because of the rapid evolution of heat. It is disclosed that the boron trifluoride of Thomas may be modified through the inclusion of a potassium acid fluoride salt to give an acceptable product. The olefins employed by Thomas include from 5 to 15 carbon olefins for use in obtaining polymers containing from 10 to 30 carbon atoms. The reaction temperatures of the Thomas patent are generally in range of 32° F. (0° C.) to 212° F. (100° C.), preferably from 100° F. (38° C.) to 160° F. (71° C.).

It is known from the U.S. Pat. No. 2,416,106 issued Feb. 18, 1947 to Linn et al that olefins may be polymerized through the combination of boron fluoride and an acid fluoride metal. U.S. Pat. No. 2,585,867 to Sparks et al issued Feb. 12, 1952 describes the production of high molecular weight polymers from monomers using a boron trifluoride catalyst system with reaction temperatures from −40° C. to −103° C. In particular, Sparks is concerned with the reaction of mono-olefins with di-olefins.

Blewett in U.S. Pat. No. 4,469,910 issued Sept. 4, 1984 describes a process whereby a dimer fraction is reacted in an oligomerization process with an alpha-olefin in the presence of a phosphoric acid- modified boron tri-fluoride catalyst system. The Blewett reference is particularly concerned with the use of 6 to 12 carbon dimers obtained from the monomer which corresponds to the alpha-olefin. The oligomerization is conducted at from 5° C. to 75° C. U.S. Pat. No. 3,985,822 issued Oct. 12, 1976 to Watson describes the production of poly-n-butenes using aluminum chloride as a catalyst and employing a reaction temperature of 65° F. (18° C.) to 115° F. (46° C.).

U.S. Pat. No. 4,407,731 to Imai issued Oct. 4, 1983 describes catalytic compositions, useful in oligomerization and alkylation reactions, prepared by treating a metal oxide support such as aluminum with an aqueous solution of an acid. One of the catalysts suggested for use in the support system of Imai is boron fluoride. U.S. Pat. No. 4,429,177 to Morganson et al issued Jan. 31, 1984 describes obtaining an alpha-olefin polymer in the presence of a 3 component catalyst system comprising a solid absorbant, boron trifluoride and elemental oxygen. U.S. Pat. No. 1,885,060 issued Oct. 25, 1932 to Hofmann et al describes using boron fluoride as a catalyst for propylene or butylene. It is also disclosed that various hydrogen halides may also be utilized with the boron fluoride.

Schmurling et al U.S. Pat. No. 2,369,691 issued Feb. 20, 1945 describes the use of sulfuric acid and metal halides of the Friedel-Crafts type. The catalyst system is stated to be useful in the isomerization of saturated hydrocarbons, the alkylation of cyclic aliphatic hydrocarbons, and in the polymerization of unsaturated hydrocarbons. U.S. Pat. No. 2,404,788 issued Jul. 30, 1946 to Burk et al discloses various aluminate or silicate support systems for boron trifluoride.

U.S. Pat. No. 4,400,565 issued to Darden et al Aug. 23, 1983 describes oligomerizing olefins in the presence of boron trifluoride and a co-catalyst comprising a heterogeneous cationic ion exchange resin. U.S. Pat. No. 2,442,645 to Elwell et al issued Jun. 1, 1948 describes the polymerization of normal lower mono-olefins which are dissolved in liquid sulfur dioxide. The reaction according to Elwell is carried out in the presence of a boron fluoride catalyst.

U.S. Pat. No. 2,406,869 to Upham issued Sept. 3, 1946 describes the preparation of an olefin polymerization catalyst comprising boron trifluoride and a hydrogen halide source. U.S. Pat. No. 2,199,180 to Laughlin which issued Apr. 30, 1940 describes the use of sulfuric acid and phosphoric acid for the polymerization of lower olefins. It is stated in Laughlin that it is desirable when treating the lower olefins to maintain the reaction temperature of above 200° F. (95° C.).

U.S. Pat. No. 2,536,841 issued Jan. 2, 1951 to Dornie describes the use of aluminum halides to polymerize olefins. The reaction temperatures suggested by Dornie are from 0° C. to −164° C. Dornie utilizes a low-freezing non-reacting solvent such as chloroform or sulfur dioxide in his process. U.S. Pat. No. 2,357,926 issued Sept. 12, 1944 to Bannon describes the use of boron fluoride and water for the polymerization of olefins.

U.S. Pat. No. 2,569,383 to Leyonmark et al issued Sept. 25, 1951 describes the polymerization of olefins from mono-olefins and polyolefins to give drying oils. U.S. Pat. No. 2,960,552 to Wasley issued Nov. 15, 1960 describes the use of methylchloride and boron trifluoride gas to polymerize lower olefins. U.S. Pat. No. 2,855,447 issued Oct. 7, 1958 to Griesinger et al describes an example of the polymerization of lower olefins through the use of hydrogen fluoride and boron trifluoride at temperatures of about 175° F. (79° C.). Block et al in U.S. Pat. No. 3,126,420 issued Mar. 24, 1964 describes the use of phosphoric acid and kielsguher to polymerize propylene at temperatures of 450°

F. (232° C.) to 650° F. (343° C.). The conditions for Block's reaction are from 600 to 1200 psi (4,100 KPa −8,100 KPa). Griesinger in U.S. Pat. No. 2,855,447 issued Oct. 7, 1958 discloses that olefins may be polymerized with boron trifluoride.

Perilstein in U.S. Pat. No. 3,749,560 issued Jul. 31, 1973 describes the polymerization of a mixture of mono-olefins from C-12 and greater through the use of aluminum trichloride at temperatures of about 15° C. to give polymers having a molecular weight of about 350 to about 1,500. Robert in U.S. Pat. No. 3,932,553 issued Jan. 13, 1976 discusses the polymerization of propylene in the presence of butadiene at 0° C. to 60° C. with boron trifluoride. Robert further discloses the use of phosphoric acid catalytic treatment of the di-olefin at from 130° C. to 250° C. British patent No. 1,449,840 to Sanders published Sept. 15, 1976 describes the alkylation of benzene through the use of a Friedel-Crafts catalyst system.

It has been found in the present invention that a high vinylidene content polymer may be obtained by reacting a lower alkene monomer in the presence of a boron trifluoride and mineral acid catalyst system at about −3° C. to about −30° C. thereby giving an olefin polymer which is useful for producing an oil soluble composition. The olefin polymers of the present invention are highly reactive materials in that they contain a large degree of reactive mono-unsaturation.

Throughout the specification and claims percentages and ratios are by weight, temperatures are in degrees Celsius, and pressures are in KPa gauge unless otherwise indicated. Ranges and ratios utilized herein are illustrative and such may be combined to further describe the invention. It is also understood that mixtures of ingredients may be employed for each stated ingredient. The references cited herein are, to the extent applicable, incorporated by reference for their disclosures.

SUMMARY OF THE INVENTION

The present invention describes a process for preparing a lower alkene polymer from a lower alkene monomer feed-stream, including the steps of: (A) contacting the lower alkene monomer with a catalyst system comprising boron trifluoride and at least one acid and (B) polymerizing the lower alkene monomer in the presence of the catalyst system at a temperature of about −3° C. to about −30° C. thereby obtaining a lower alkene polymer having a molecular weight of about 250 to about 500.

A further feature of the invention is a composition of matter which is a polymer of a $C_{2-6}$ mono-olefin having a molecular weight of about 250, preferably at least about 300, to about 500 and a vinyldiene to trisubstituted olefin content of at least 1:4, typically at least 1:3 and more typically at least 3:7 by weight.

Another feature of the invention is a composition of matter which is the polymer of a $C_{2-6}$ mono-olefin having the above-described molecular weight and a combined weight ratio of trisubstituted and tetrasubstituted olefin to the vinylidene of less than 9:1, typically less than 8:1, more typically less than 6:1 and most typically less than 4:1. Alternatively, the vinylidene to tetrasubstituted olefin weight ratio is at least 7:11.

Also described herein are various products including the lower alkene polymer, and the reaction product of the lower alkene polymer with an aromatic compound such as phenol, toluene or benzene and their sulfonated derivatives. Further described herein are overbased compositions of the above sulfonated derivatives. The reaction products of the lower alkene polymer and a carboxylic acid acylating agent such as maleic acid or anhydride are also disclosed.

DETAILED DESCRIPTION OF THE INVENTION

The present invention deals with the polymerization of lower alkene monomers to obtain a lower alkene polymer having a molecular weight of about 250, preferably about 300, to about 500. The products obtained in the invention have a high degree of mono-unsaturation content typically at least about 85 mole percent of the polymer, preferably at least about 90% and even more preferably 95%–100%.

The polymerization of the lower alkene monomer to the polymer desirably gives a product which contains a high vinylidene content. A vinylidene structure is as follows:

$(R)_2C=CH_2$        (A)

where each R group contains at least one carbon atom. As the various R groups become more complex, the later described alkylation process becomes more difficult. Moreover, the presence of a significant amount of trisubstituted olefin (B) or tetrasubstituted olefin (C), as shown below, significantly reduces the reactivity in alkylation reactions.

$(R)_2C=CH(R)$        (B)

$(R)_2C=C(R)_2$        (C)

Thus, internal olefins are not as reactive in alkylation reactions as are vinylidene components.

In the present invention, the vinylidene content may be augmented by any alpha-olefin content present in the product or added to the product. An alpha-olefin is of the formula:

$RHC=CH_2$        (D)

For convenience in defining the present invention, the following criteria is employed. The vinylidene content of the total mono-unsaturation present is typically at least about 15%, more typically 20% and most typically at least 25%. The weight ratio of vinylidene to trisubstituted olefin is about 1:4 to about 8:1, typically about 1:3 to about 5:1, and often at least 1:4 and more typically at least 1:3. The amount of vinylidene and other substituted olefins are conveniently obtained by carbon 13 NMR as referred to in Determination of *Molecular Structure of Hydrocarbon Olefins by High Resolution Nuclear Magnetic Resonance*, Stehling et al, Anal. Chem. 38, (11), pp. 1467–1478 (1966). See also $^{13}C$ *Chemical Shifts of Some Model Olefins* by Couperus et al, Org. Magn. Reson. 8, pp. 426–431 (1976). The foregoing articles are incorporated by reference.

In conjunction with the vinylidene content, it is preferred that the unsaturation content of the polymer is as defined as above and determined by ASTM D-1159-66 (Reapproved 1970) herein incorporated by reference.

The lower alkene polymer is obtained from a lower alkene monomer typically containing from about 2 to about 6 carbon atoms. Typically, the lower alkene monomer contains from about 2 to 4 carbon atoms such as butene and most preferably propylene (propene).

The feed stream of the lower alkene monomer is preferably free of diene or higher moieties. The diene or higher unsaturated moieties can lead to the formation of diphenyl alkanes upon alkylation. By being substantially free of diene moieties, it is desired that there be no more than 10%, preferably no more than 5% by weight of diene or higher unsaturated moieties present in the feed stream. Most preferably, it is desired that the feed stream be completely free of diene moieties.

It is also highly desired that the alkene monomer such as the propylene or butene be an alpha olefin. By alpha olefin is meant that the unsaturation in the alkene monomer is between the first and second carbon atoms in the molecular structure. A further desired feature of the present invention is where the lower alkene monomer is at least 95% of a single species. By single species, it is meant that a single lower alkene monomer is the predominant species within the feed stream. That is, where the lower alkene monomer contains 4 carbon atoms, it is desirable that the monomer is substantially pure 1-butene rather than in a mixture with 2-butene or isobutylene. Of course, for the preferred propene only one isomer, e.g., 1-propene, exists.

The feed streams for the present invention are typically obtained through catalytic cracking of petroleum feed stocks. Thus, all of the lower alkene monomers with which the present invention is concerned are available as articles of commerce.

The lower alkene polymer obtained according to the present invention typically has a molecular weight between about 250, preferably about 300, and about 500, preferably about 325 to about 475, more preferably from about 350 to about 450, and most preferably from about 380 to about 420. The lower alkene polymer, as later discussed, is conveniently utilized for the alkylation of benzene or other aromatic compounds which are then further converted to form alkylated aromatic sulfonic acids which are utilized as detergent substrates for overbasing in the lubricant industry. Other uses, as later described herein, are the alkylation of acylating agents such as carboxylic acids and anhydrides, phenols and the like.

The catalyst system employed herein has as a first component boron trifluoride. The boron trifluoride may be obtained as the gas commercially, generated in situ or obtained as the etherate.

The second component utilized as part of the catalytic system is a strong acid such as a mineral acid. The mineral acids include the hydrogen halides, sulfuric acid, sulfurous acid and the various phosphoric acids. Among the phosphoric acids are $H_3PO_4$, $HPO_3$ and $H_4P_2O_7$. Any strong acid may be employed in the present invention provided that the desired polymer is obtained. Thus, while phosphoric acid or sulfuric acid are the preferred acids for use herein, any highly protic acid may be used. Thus, strong acid resins such as Amberlyst TM may be used in the present invention. The amount of acid is that amount sufficient to catalyze the reaction typically about 0.005% to about 1% by weight of the polymer.

It is also possible to superacidify the acids employed herein. Thus, it is possible to use oleum (fuming sulfuric acid) or glacial phosphoric acid through the introduction of $P_2O_5$ to phosphoric acid in order to increase the acid strength. It has been found, however, that the typical commerical strength acid, e.g., 85% phosphoric or 98% sulfuric are adequate within the present invention to accomplish the desired polymerization of the lower alkene monomer to the lower alkene polymer. Typically, a preferred acid is an aqueous solution containing 70-95% by weight of phosphoric acid ($H_3PO_4$).

The boron trifluoride is employed such that it saturates the reaction mixture. Due to the strength of both the acid and the corrosive nature of the source of boron trifluoride, it is suggested that the reactions be run in a glass lined or stainless steel vessel. Under the conditions with which the present invention is practiced, it is acceptable to run at atmospheric pressure.

It is believed that the restrictive temperature conditions under which the lower alkene monomer is polymerized in the presence of the catalyst system gives the high degree of unsaturation content retained in the polymer together with the narrow molecular weight distribution. In the present invention, it is highly desired that the product be mono-unsaturated so that it may be alkylated onto an aromatic ring in the desired manner. The subsequent alkylation conditions are such that internal unsaturation in a polymer of similar molecular weight but prepared outside the scope of the present invention will result in degradation of the polymer or products other than the desired alkylation products. Thus, temperature is viewed as being critical to the scope of the present invention in order to obtain the high vinylidene content with the desired 250 to 500 molecular weight. The temperature conditions under which the desired products of the present invention are obtained are from about $-3°$ C. to about $-30°$ C., preferably about $-5°$ C. to about $-25°$ C. and most preferably about $-8°$ C. to about $-20°$ C. It was unexpected that the narrow temperature ranges within which the reaction is run in order to obtain the lower alkene polymer from the monomer would also result in a material which had a high reactive mono-unsaturation content of the desired molecular weight.

The catalyst system as previously discussed may be immobilized, heterogeneous, supported or in any other manner in which catalysts are utilized provided that the objects of the invention are met. The substrates which may be employed in the present invention include kieselguhr, clay, charcoal, aluminosilicates, alumina, silica, diatomaceous earth and various other metal silicates.

A heterogeneous catalyst system would, for example, simply be a mixture of $BF_3$ (boron trifluoride) and the acid, e.g., phosphoric. Typically, the heterogeneous system is obtained by bubbling gaseous boron trifluoride through the liquid acid/monomer/polymer mixture.

The temperature conditions of the present invention are met through the use of standard cooling devices. It is preferred that the polymerization of the lower alkene monomer to the lower alkene polymer be conducted such that the temperature of the reactants does not exceed the desired parameters for any substantial period of time during the processing. Thus, if a batch system is employed in order to obtain the lower alkene polymer, the reaction vessel and the contents should be maintained within the desired temperature range until substantially no lower alkene monomer is present, e.g., 5% or less. Where a continuous processing system is utilized, the lower alkene polymer is drawn off as it is formed.

Various solvents may be used in the present invention. It is conveniently preferred that a paraffinic hydrocarbon solvent which is normally liquid be employed herein. The solvents should be materials which are easily distillable from the reaction mixture following the polymerization reaction. Suitable examples of solvents include hexane, pentane, heptane, or butane. Other suitable solvents include halogenated aliphatics or carbon disulfide.

The following are examples of the present invention.

EXAMPLE I

A mixture is prepared comprising 200 grams hexane, 8 grams of phosphoric acid and 80 grams of DD1600 filter aid. The filter aid is utilized as the catalyst substrate. The premixture is obtained by first combining the filter aid and the hexane and thereafter adding 85% phosphoric acid to the mixture. The mixture is stirred for about 30 seconds.

A 12-liter, 10-necked round bottom flask equipped with a stirrer, thermometer, dry ice/isopropanol condenser, 4 surface inlet tubes for propylene and 1 surface inlet tube for boron trifluoride is charged with the material described above. An additional 2200 grams of hexane solvent is added to the system.

The mixture described above is cooled to $-20°$ C. and boron trifluroride is introduced to the system at 1.0 cubic foot per hour (1.25 moles/hour) for 20 minutes until the system is saturated. Evidence of saturation will be observed by boron trifluoride fumes venting from the condenser. The rate of flow of the boron trifluoride is then adjusted to about 0.2 cubic foot per hour (0.25 mole/hour). The latter rate of boron trifluoride flow is maintained for the duration of the polymerization reaction.

Propylene gas is then added through the remaining 4 inlet tubes at 20 cubic feet per hour total (25 moles/hour). The temperature bath is maintained at $-46°$ C. to $-60°$ C. to hold the $-20°$ C. charge temperature. The flow rate of propylene is about 1 drop per minute condensed on a dry ice condenser during the propylene addition. A total of 121 cubic feet (150 moles) of propylene total is charged to the reaction vessel.

The propylene and boron trifluoride feed are stopped and the charge is neutralized with 80 grams of caustic soda liquid (50% aqueous). The charge is stirred for several hours to ensure neutralization. The product (lower alkene polymer) is filtered through a cake of approximately 30 grams of the DD1600 filter aid.

The product is then vacuum stripped in a separate 12-liter, 3-necked flask at 30 mm Hg (4 KPa) at 100° C. to remove the hexane. A second strip at 9 mm Hg (1.2 KPa) at 163° C. to remove the light ends results in the desired product in the amount of 5,418 grams.

The process will give near quantitative conversion to the polymer when a closed system is employed, e.g., the excess propylene is not vented.

EXAMPLE II

A 12-liter, 10-necked round bottom flask is equipped with a stirrer, thermometer, dry ice/isopropanol condenser, 4-surface inlet tubes for propylene and 1-surface inlet tube for boron trifluoride. The reaction vessel is immersed in a cooling bath and is charged with 2400 grams of hexane, 120 grams of silica gel and 12 grams of phosphoric acid in that order. The foregoing mixture is stirred at high speed for 15 minutes.

The reaction mixture is cooled to $-27°$ C. and boron trifluoride is added to the system at 1.5 cubic feet per hour (2.25 moles/hour) for a period of 23 minutes until the system is saturated. The boron trifluoride flow rate is then changed to 0.1 to 0.2 cubic feet per hour for the duration of the polymerization. The foregoing flow rate is sufficient to maintain saturation within the system.

Propylene is added through the remaining inlet tubes. The initial feed rate is 20 cubic feet per hour (30 moles/hour). In order to maintain the reaction mixture at $-20°$ C., the flow rate of propylene is decreased by 20%. The bath temperature is maintained at $-48°$ C. to $-50°$ C. to maintain the $-20°$ reaction temperature. The reaction is conducted over a period of about 5-½ hours at a rate of 1 drop of propylene per minute condensed on the dry ice condenser during the propylene addition. A total 98.3 cubic feet (148 moles) of propylene was charged to the reactor during the reaction time.

Following complete addition of the propylene, the boron trifluoride feed is stopped and the reaction mixture is neutralized with 200 grams of calcium hydroxide. The reaction mixture is stirred for several hours to ensure neutralization and the charge is filtered through 50 grams of DD1600.

The filtered reaction mixture is then placed in another reaction vessel and vacuum stripped at 100° C. and 72 mm mercury (9.5 Kpa) to remove the hexane. Subsequently, the reaction mixture is raised to 161° C. and a vacuum of 24 mm mercury (3.2 KPa) issued to remove 7 grams of light end material leaving a residue of 4,386 grams of the liquid product.

EXAMPLE III

A detergent alkylate is prepared from toluene and the lower alkene polymer of Example I.

Toluene in the amount of 4517 grams is added to a 12-liter 4-neck flask equipped with a stirrer, thermometer sub-surface tube and ice condenser. Thirty grams of aluminum chloride catalyst are also added to the flask.

The mixture described above is saturated with hydrogen chloride gas blowing through the sub-surface tube at 1 cubic foot (1.5 moles) per hour for 0.3 hours. The mixture at this point is cooled to $-5°$ C.

The sub-surface tube is then replaced by an addition funnel and charged with 3000 grams of the polypropylene of Example I over a period of 1 hour. The reaction is exothermic and is maintained at a temperature between 0° C. and 8° C. Following the complete addition of the polypropylene the reactants are stirred for an additional 3 hours. At this point, 61 grams of ammonium hydroxide are slowly added through an addition funnel. Following complete addition of the ammonium hydroxide, the mixture is stirred for an additional 0.5 hours.

The reaction mixture is then filtered through 30 grams of DD1600 at 20° C. The filtrate is charged to a 12-liter, 4-necked flask equipped with a stirrer, thermometer, goose-neck and condenser receiver flask. The filtrate is then vacuum stripped to 160° C. and 10 mm mercury (1.3 Kpa). The product is then allowed to cool to room temperature and filtered a second time through 30 grams of DD1600 to give 3505 grams of the filtrate as product.

The yield is approximately 95% wherein the product has an Mn by GPC of 402 and a Mw by GPC of 430. The viscosity at 100° C. is 10.79 cks.

A further variation of the use of the composition of the present invention is the sulfonation of the above-described detergent alkylate according to conventional methods. A still further variation of the above example is to overbase the sulfonated detergent alkylate. Both of the foregoing techniques are known to one skilled in the art.

What is claimed is:

1. A product by process for preparing a lower alkene polymer from a lower alkene monomer feedstream, including the steps of: (A) contacting the lower alkene monomer with a catalyst system comprising boron trifluoride and at least one acid selected from the group consisting of sulfuric acid, sulfurous acid, phosphoric acids, and strong acid resins and (B) polymerizing the lower alkene monomer in the presence of the catalyst system at a temperature of about $-3°$ C. to about $-30°$ C. thereby obtaining a lower alkene polymer having a molecular weight of about 250 to about 500.

2. The product by process of claim 1 wherein the alkene feedstream is substantially free of diene moieties.

3. The product by process of claim 1 wherein the lower alkene is a $C_2$-$C_6$ alkene monomer.

4. The product by process of claim 1 wherein the acid is phosphoric acid.

5. The product by process of claim 1 wherein the alkene monomer is an alpha olefin.

6. The product by process of claim 1 wherein the temperature is about $-5°$ C. to about $-25°$ C.

7. The product by process of claim 1 wherein the alkene is propene.

8. The product by process of claim 1 wherein the catalyst is supported.

9. The product by process of claim 1 wherein the acid is an aqueous solution containing 70–95% by weight phosphoric acid.

10. The product by process of claim 1 wherein the alkene monomer feedstream is at least 95% of a single species.

11. The product by process of claim 1 wherein an immobilized catalyst system is employed.

12. The product by process of claim 1 wherein the lower alkene polymer feedstream has an 85% or greater mono-unsaturation content.

13. The product by process of claim 1 wherein the lower alkene polymer has a molecular weight of about 300 to about 450.

14. The product by process of claim 1 wherein the acid is sulfuric acid.

15. The product obtained from the process of claim 1.

16. The product by process of claim 1 alkylated onto an aromatic ring.

17. The product by process of claim 16 wherein the aromatic ring is sulfonated.

18. The product of claim 1 which is reacted onto a maleic acid or maleic anhydride.

19. The product by process of claim 17 wherein the aromatic ring is a phenol.

20. The product by process of claim 1 which is a liquid at 20° C.

21. The product by process of claim 15 having a mono-unsaturation content of 85% or greater.

22. The product by process of claim 1 reacted with an acylating agent.

23. The product by process of claim 17 which is overbased with a metal containing compound.

24. A composition of matter comprising a polymer of a $C_{2-6}$ mono-olefin having a molecular weight of about 250 to about 500 and a vinylidene to trisubstituted olefin content of at least 1:4 by weight.

25. The composition of claim 24 wherein the mono-olefin is propene.

26. A composition of matter which is a polymer of a $C_{2-6}$ mono-olefin wherein the polymer has a molecular weight of about 250 to about 500 and a combined weight ratio of trisubstituted olefin and tetrasubstituted olefin to vinylidene of less than 9:1.

27. The composition of claim 26 wherein the mono-olefin is propene.

28. The composition of claim 26 wherein the weight ratio is less than 17:2.

29. A composition of matter which is a polymer of a $C_{2-6}$ mono-olefin wherein the polymer has a molecular weight of about 250 to about 500 and a vinylidene to tetrasubstituted olefin content of at least 3:7 by weight.

30. The composition of claim 29 wherein the mono-olefin is propene.

31. The composition of claim 29 wherein the weight ratio is at least 7:11.